United States Patent
He

(10) Patent No.: US 9,774,704 B2
(45) Date of Patent: Sep. 26, 2017

(54) HOME GATEWAY, CLOUD SERVER, AND METHOD FOR COMMUNICATION THEREBETWEEN

(71) Applicant: Huawei Device Co., Ltd., Shenzhen, Guangdong (CN)

(72) Inventor: Zhiqin He, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 1155 days.

(21) Appl. No.: 13/850,924

(22) Filed: Mar. 26, 2013

(65) Prior Publication Data
US 2013/0290548 A1 Oct. 31, 2013

(30) Foreign Application Priority Data
Mar. 26, 2012 (CN) .......................... 2012 1 0082775

(51) Int. Cl.
*G06F 15/16* (2006.01)
*H04L 29/06* (2006.01)
*H04L 12/28* (2006.01)

(52) U.S. Cl.
CPC .......... *H04L 69/16* (2013.01); *H04L 12/2818* (2013.01)

(58) Field of Classification Search
CPC ........................... H04L 69/16; H04L 12/2818
USPC .................................................. 709/228, 238
See application file for complete search history.

(56) References Cited

U.S. PATENT DOCUMENTS

| 7,818,790 B1 * | 10/2010 | Burns | H04L 63/08 713/193 |
| 2005/0083940 A1 * | 4/2005 | Eales | H04Q 3/0029 370/395.2 |
| 2005/0216302 A1 | 9/2005 | Raji et al. | |
| 2007/0275715 A1 * | 11/2007 | Lee | H04L 12/2814 455/427 |
| 2009/0312853 A1 * | 12/2009 | Kore | G05B 19/4185 700/90 |

(Continued)

FOREIGN PATENT DOCUMENTS

| CN | 101938391 A | 1/2011 |
| CN | 102193526 A | 9/2011 |

(Continued)

*Primary Examiner* — Bryan Lee
*Assistant Examiner* — Oluwatosin Gidado
(74) *Attorney, Agent, or Firm* — Leydig, Voit & Mayer, Ltd.

(57) ABSTRACT

Embodiments of the present invention disclose a method and an apparatus for communication between a home gateway and a cloud server. The cloud server has a home gateway software running unit, and various software modules are arranged in the home gateway software running unit. The method includes the following: The cloud server establishes a data communication channel with the home gateway through a TCP/IP protocol, where a terminal is connected to the home gateway through a short-distance communication protocol; and the home gateway software running unit sends a first software message to the home gateway through the data communication channel so that the home gateway forwards the first software message to a first terminal to which the first software message is directed; or the home gateway software running unit receives a second software message from the home gateway through the data communication channel.

17 Claims, 7 Drawing Sheets

S31 — The home gateway establishes a data communication channel with the cloud server through the TCP/IP protocol S32 — The home gateway receives a first software message from the cloud server through the data communication channel in order to forward the first software message to a first terminal to which the first software message is directed; or sends a second software message to the cloud server, where the second software message is sent by a second terminal to the home gateway

(56) References Cited

U.S. PATENT DOCUMENTS

| | | | |
|---|---|---|---|
| 2012/0026865 A1* | 2/2012 | Fan | H04W 76/02 370/225 |
| 2012/0042082 A1* | 2/2012 | Liao | H04L 61/1505 709/227 |
| 2012/0059932 A1 | 3/2012 | Messer et al. | |
| 2013/0066940 A1 | 3/2013 | Shao | |
| 2013/0110998 A1* | 5/2013 | Zrelli | H04L 67/2823 709/223 |

FOREIGN PATENT DOCUMENTS

| | | | |
|---|---|---|---|
| CN | 102255933 A | 11/2011 |
| CN | 102279748 A | 12/2011 |
| CN | 102638460 A | 8/2012 |

* cited by examiner

HOME GATEWAY, CLOUD SERVER, AND METHOD FOR COMMUNICATION THEREBETWEEN

CROSS-REFERENCE TO RELATED APPLICATION

This application claims priority to Chinese Patent Application No. 201210082775.9, filed on Mar. 26, 2012, which is hereby incorporated by reference in its entirety.

FIELD OF THE INVENTION

The present invention relates to the field of network and communication technologies, and in particular, to a home gateway, a cloud server, and a method for communication between the home gateway and the cloud server.

BACKGROUND OF THE INVENTION

An intelligent home network is a high-tech product brought by the information era. It uses the computer network technology in the prior art to interconnect various devices at home and provide various services through the network. A home gateway is a "portal" (or a bridge) for communication between a home network and an external server, and its performance has a great impact on the communication between the home network and the external server.

Application software of the home gateway in the prior art is directly burned to a memory (such as a FLASH, namely, a flash memory) in the gateway in the manufacturing process of the home gateway, which means that it is difficult to extend the application software subsequently, that is, upgrading the software mainly refers to fixing BUGs and it is difficult to load new software. In addition, the loading of the application software needs to occupy certain CPU processor resources and storage resources, while the quantity of services implemented by the home gateway corresponds to the quantity of loaded application software. Therefore, the services that can be implemented by the home gateway are in proportion to the device internal resources, which means that many device internal resources are required if many services need to be implemented. As a result, the costs of the home gateway device increase inevitably.

SUMMARY OF THE INVENTION

In view of the foregoing disadvantages, embodiments of the present invention provide a home gateway, a server, and a method and system for communication between the home gateway and the server, so that the home gateway having limited device internal resources can implement plenty of services and may further have good extensibility.

The embodiments of the present invention are implemented as follows:

In one aspect, a method for communication between a cloud server and a home gateway is provided, where the cloud server has a home gateway software running unit configured to run service software of the home gateway, and the method includes: establishing, by the cloud server, a data communication channel with the home gateway through a Transmission Control Protocol/Internet Protocol TCP/IP, where a terminal is connected to the home gateway through a short-distance communication protocol; and sending, by the home gateway software running unit, a first software message to the home gateway through the data communication channel so that the home gateway forwards the first software message to a first terminal to which the first software message is directed; or receiving, by the home gateway software running unit, a second software message from the home gateway through the data communication channel, where the second short-distance communication message is sent by a second terminal to the home gateway and forwarded by the home gateway to the cloud server.

In another aspect, a cloud server is provided and includes: a home gateway software running unit and a software managing unit, where: the software managing unit is configured to establish a data communication channel with the home gateway through a TCP/IP protocol; and the home gateway software running unit is configured to run service software of the home gateway, and specifically configured to send a first software message to the home gateway through the data communication channel so that the home gateway forwards the first software message to a first terminal to which the first software message is directed, and receive a second software message from the home gateway through the data communication channel, where the second short-distance communication message is sent by a second terminal to the home gateway and forwarded by the home gateway to the cloud server.

In another aspect, a method for communication between a home gateway and a cloud server is provided, where a terminal is connected to the home gateway through a short-distance communication protocol, and the method includes: establishing, by the home gateway, a data communication channel with the cloud server through a TCP/IP protocol; and receiving, by the home gateway, a first software message from the cloud server through the data communication channel in order to forward the first software message to a first terminal to which the first software message is directed; or sending a second software message to the cloud server, where the second software message is sent by a second terminal to the home gateway.

In another aspect, a home gateway agent apparatus arranged in a home gateway is provided and includes: a data channel establishing unit, configured to establish a data communication channel with a cloud server; and a transparently transmitting unit, configured to: receive a first software message from the cloud server through the data communication channel and forward the first software message to a first terminal to which the first software message is directed; or receive a second software message from a second terminal and send the second software message to the cloud server.

In another aspect, a home gateway is provided and has the foregoing home gateway agent apparatus.

As seen from the foregoing technical solutions, compared with the prior art, the embodiments of the present invention abandon the conventional idea that software modules are arranged in the home gateway; instead, a home gateway software running unit is arranged in the cloud server and configured to run service software of the home gateway; in addition, the home gateway software running unit exchanges information with a terminal by sending software messages and receiving software messages, and the service software of the home gateway may be run for different home gateways. Thereby, other new services may be implemented without being restricted by internal resources of the home gateway device, thus reducing the costs of the home gateway device; in addition, when a new service needs to be implemented, only corresponding service software needs to be loaded to the server, so that good extensibility is achieved; furthermore, the service software is detached from the home gateway, and can communicate with different home gateways, improving utilization of the software resources.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from the accompanying drawings without creative efforts.

DETAILED DESCRIPTION OF THE EMBODIMENTS

Embodiments of the present invention provide a technical solution, so that the home gateway having limited storage resources can implement plenty of services and have good extensibility; in addition, the utilization of resources is improved and waste of resources is reduced.

For the purpose of reference and clarity, the technical terms, abbreviations, or acronyms used in this text are summarized as follows:

JVM, Java Virtual Machine, java virtual machine;

OSGI, Open Service Gateway Initiative, Open Service Gateway Initiative Protocol;

UPnP, Universal Plug and Play, Universal Plug and Play, which is a structure for peer to peer network connectivity (P2P) between various intelligent devices, wireless devices, personal computers, and so on all over the world, and is a distributed and open network architecture;

TCP/IP, Transmission Control Protocol/Internet Protocol, Transmission Control Protocol/Internet Protocol;

DLNA, Digital Living Network Alliance, Digital Living Network Alliance.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In the solution provided by the present invention, a home gateway software running unit is arranged in the cloud server (also referred to as a server hereinafter for ease of description) and is configured to run service software of the home gateway.

Figure 1:
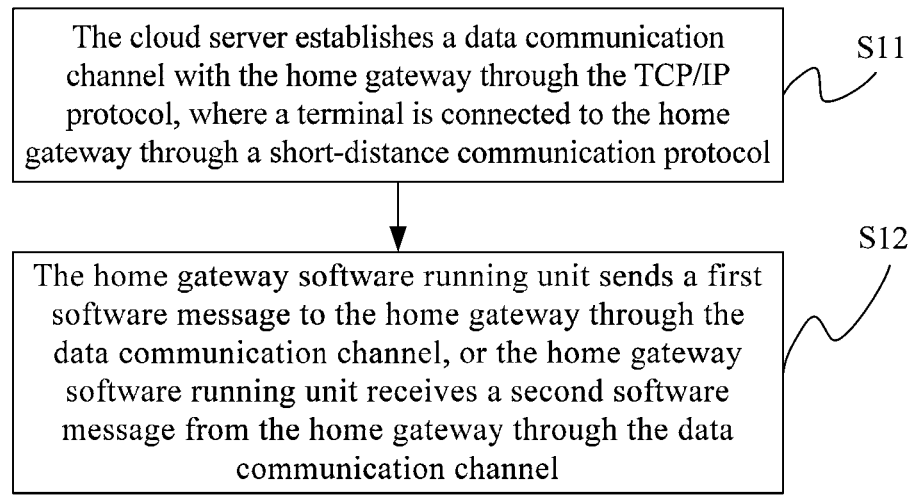
FIG. 1 is a flowchart of a method for communication between a home gateway and a server according to an embodiment of the present invention.

FIG. 1 is a flowchart of a method for communication between a home gateway and a cloud server according to an embodiment of the present invention, where the method includes the following steps:

Step S11: The cloud server establishes a data communication channel with the home gateway through the TCP/IP protocol, where a terminal is connected to the home gateway through a short-distance communication protocol.

The server and the home gateway determine a data transmission channel through negotiation and based on the short-distance communication protocol. According to an embodiment, the short-distance communication protocol is a Zigbee (Zigbee) protocol or a UPnP protocol, or other communication protocols that those skilled in the art can think of, and its function is to establish a connection between the home gateway and its terminals.

Preferably, the home gateway may be a registered home gateway, that is, the cloud server provides services for only the registered home gateway.

Step S12: The home gateway software running unit sends a first software message to the home gateway through the data communication channel so that the home gateway forwards the first software message to a first terminal to which the first software message is directed; or the home gateway software running unit receives a second software message from the home gateway through the data communication channel, where the second short-distance communication message is sent by a second terminal to the home gateway and forwarded by the home gateway to the cloud server.

It can be seen that in the solution provided by this embodiment, resources (storage resources, computing resources of the processor, and so on) may be allocated in the cloud server and are used as storage and running spaces of various service software, and then the data required in the process of executing home services is transmitted through the data communication channel between the cloud server and the home gateway. This manner abandons the conventional idea that the software modules are arranged in the home gateway. Instead, the service software of the home gateway is run on the server; in addition, the cloud server exchanges information with a terminal by sending software messages and receiving software messages, and the service software can be shared by different home gateways. Therefore, the home gateway having limited storage resources can implement a large number of new services, and the costs of the home gateway device are reduced. In addition, when a new service needs to be implemented, only corresponding service software needs to be loaded to the server, so that good extensibility is achieved.

It should be noted that the home gateway software running unit in the server may also determine multiple subunits according to the number of home gateways, and different subunits correspond to different home gateways, where the subunits may be referred to as dedicated subunits. Alternatively, the home gateway software running unit is not divided into subunits, that is, the whole home gateway software running unit is shared by all home gateways, and can communicate with different home gateways, which improves utilization of software resources, and avoids the problem of resource waste caused by arranging the same service software repetitively for multiple home gateways. Certainly, after the home gateway software running unit is divided into multiple subunits according to the number of home gateways, a part of the subunits may also be used as dedicated subunits (that is, the software in the subunits is dedicated to a home gateway), and other subunits are used as common units (that is, the software modules in the units are shared by all home gateways).

If the home gateway is faulty, or the home gateway cannot be connected to the server due to other reasons, to reduce overheads and avoid waste, the unit or subunit specified by the home gateway may be shut down. The home gateway may send specified information beforehand or provide some parameters to specify the foregoing unit or subunit.

Preferably, the cloud server may also determine whether the home gateway is in the online state; before the cloud server establishes the data communication channel with the home gateway through the TCP/IP protocol, when determining that the home gateway is in the online state, the cloud server executes the step of establishing the data communication channel; after the cloud server establishes the data communication channel with the home gateway through the TCP/IP protocol, when determining that the home gateway is not in the online state, the cloud server releases service software of the home gateway. Releasing service software means that the service software does not serve the current home gateway any longer. Releasing service software may be shutting down the service software specified by the home gateway and disconnecting the data communication channel, or may be that the service software can still be used by other home gateways, both of which are included in the scope of disclosure of the embodiment of the present invention.

According to an embodiment, the determining whether the home gateway is in the online state includes: periodically monitoring a working state of the home gateway, and if a power-on working state of the home gateway is obtained by performing the monitoring, determining that the home gateway is in the online state, or otherwise, determining that the home gateway is not in the online state.

In a solution provided by another embodiment of the present invention, after the data communication channel is established, a keep-alive mechanism is established between the home gateway and the cloud server. For example, the home gateway, after being powered on, sends a connection request to the cloud server, and sends the preset data periodically after establishing a data channel with the cloud server; if the cloud server does not receive, within the preset time, the preset data sent by the home gateway, the cloud server considers that the home gateway is not online and therefore releases service software of the home gateway. The preset time may be adjusted according to the actual requirement.

Figure 2:
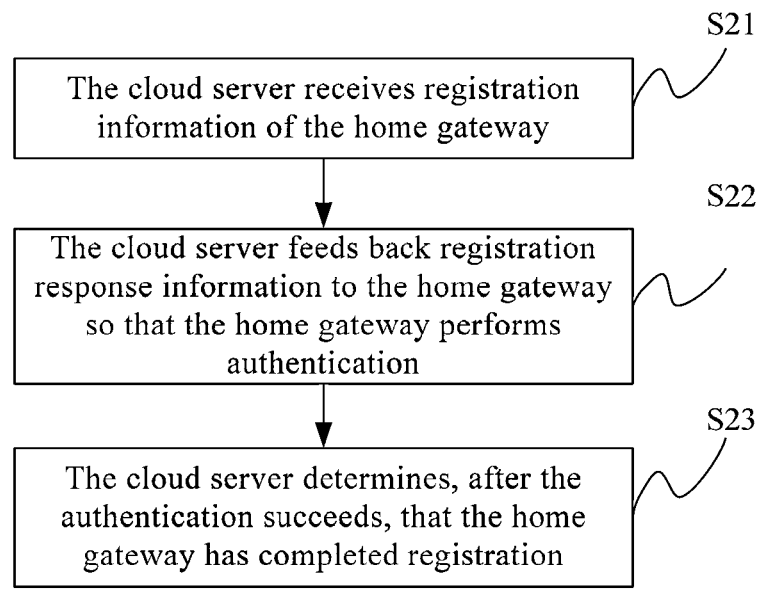
FIG. 2 is a flowchart of registration by a home gateway in a method for communication between the home gateway and a server according to an embodiment of the present invention.

According to an embodiment, alternatively, the home gateway is a registered home gateway, and the process of accepting registration of the home gateway by the cloud server is shown in FIG. 2 and includes the following steps:

Step S21: The cloud server receives registration information of the home gateway.

The registration information includes a user name, a password, a home gateway address, a listening port number, and a device type.

Step S22: The cloud server feeds back registration response information to the home gateway so that the home gateway performs authentication.

Feed back registration response information to the home gateway so that the home gateway performs authentication, and therefore, implements a bi-directional authentication process.

Step S23: The cloud server determines, after the authentication succeeds, that the home gateway has completed registration.

If the authentication succeeds, the home gateway is determined as a legal gateway, or otherwise, the home gateway is an illegal gateway and cannot execute subsequent operations.

The server may establish a data communication channel with the home gateway in the following way: initiating a TCP/IP connection to the home gateway according to the home gateway address and listening port number, and when receiving connection establishment response information, determining that the data communication channel is established. The specified information in "the home gateway may send specified information beforehand" described above is the home gateway address and listening port number sent by the home gateway in the registration process.

The device type in the registration information may be used to specify service software, that is, the foregoing-mentioned service software specified by the home gateway may be service software corresponding to the device type, for example, service software is dedicated to a USB Zigbee module of a model, and the model of the used USB Zigbee module needs to be provided when the home gateway is registered. Certainly, in other embodiments, the home gateway may also send independent specified information to specify service software. The present invention imposes no limitation in this regard.

The above describes the process of communication between the server and the home gateway from the perspective of the server. The following is a supplement to and description of the solution of this embodiment from the perspective of the home gateway.

Figure 3:
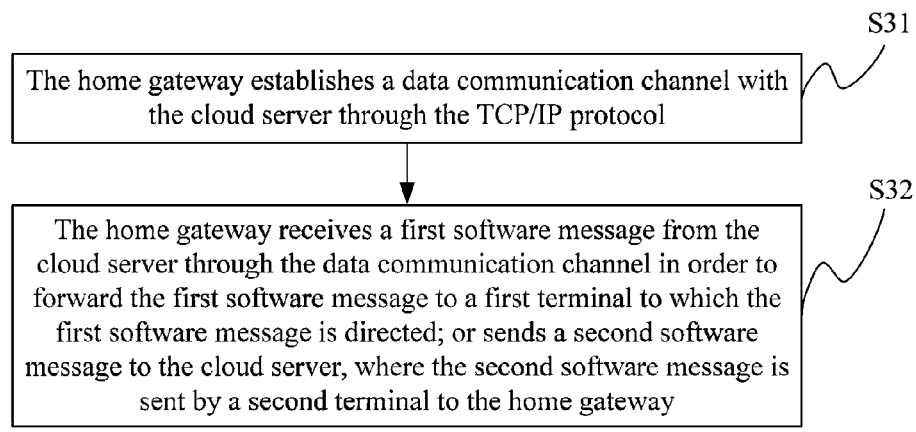
FIG. 3 is a flowchart of another method for communication between a home gateway and a server according to an embodiment of the present invention.

From the perspective of the home gateway, the process of communication between the home gateway and the server is shown in FIG. 3 and includes the following steps:

Step S31: The home gateway establishes a data communication channel with the cloud server through the TCP/IP protocol.

The server is notified when the home gateway is in the online state. The home gateway listens to a TCP/IP connection instruction from the server, and after receiving a TCP/IP connection instruction that is initiated by the server according to the home gateway address and listening port number, feeds back response information to the server to determine that the data communication channel is established. For example, the home gateway, when being powered on, notifies the server by sending information, and then the server initiates a TCP/IP connection; after response information is fed back to the server, the server determines that the data communication channel is established.

Preferably, the home gateway is a registered legal home gateway, and its registration process is: first sending registration information to the server, where the registration information includes a user name, a password, a home gateway address, a listening port number, and a device type; then receiving the response information of the server and performing authentication; and finally, becoming a legal home gateway after the authentication succeeds.

Step S32: The home gateway receives a first software message from the cloud server through the data communication channel in order to forward the first software message to a first terminal to which the first software message is directed; or sends a second software message to the cloud server, where the second software message is sent by a second terminal to the home gateway.

The home gateway may send specified information beforehand or provide some parameters to specify the required service software, for example, specify the service software corresponding to the device type by using the device type in the foregoing registration information. In addition, through the home gateway, the cloud server can exchange information with a terminal by sending software messages and receiving software messages.

This embodiment describes the process of communication between the home gateway and the server from the perspective of the home gateway, which corresponds to the content described from the perspective of the server above, and mutual reference may be made for details.

Another embodiment of the present invention further provides apparatuses for implementing the foregoing methods, and the following describes the apparatuses one by one.

Figure 4:
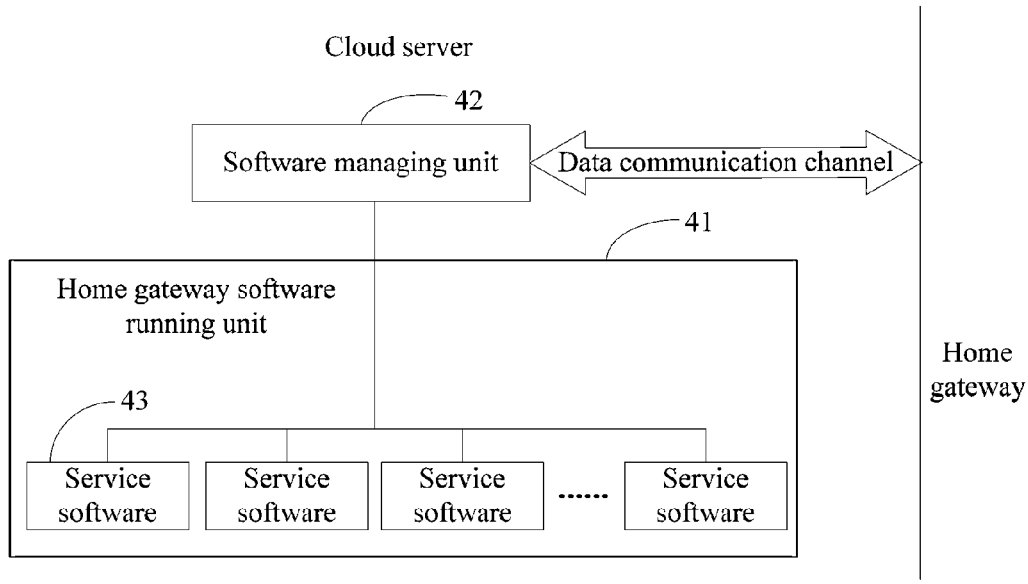
FIG. 4 is a schematic structural diagram of a cloud server according to an embodiment of the present invention.

FIG. 4 shows a cloud server, including a home gateway software running unit 41, a software managing unit 42, and service software 43.

The software managing unit 42 is configured to establish a data communication channel with the home gateway through the TCP/IP protocol when the home gateway software running unit 41 works in the started state. The home gateway software running unit 41 is configured to run service software of the home gateway, and specifically configured to send a first software message to the home gateway through the data communication channel so that the home gateway forwards the first software message to a first terminal to which the first software message is directed, and receive a second software message from the home gateway through the data communication channel, where the second short-distance communication message is sent by a second terminal to the home gateway and forwarded by the home gateway to the cloud server.

Figure 5:
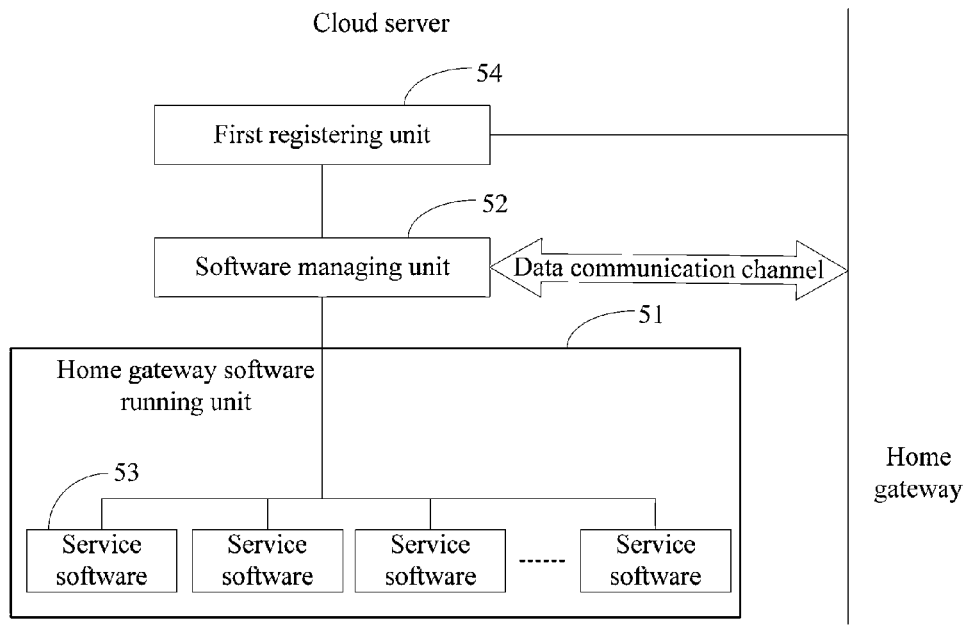
FIG. 5 is a schematic structural diagram of another cloud server according to an embodiment of the present invention.

Generally, the home gateway is registered before becoming a legal home gateway. Therefore, in some embodiments, the home gateway may further include a registering unit. As shown in FIG. 5, the cloud server further includes a first registering unit 54 in addition to a home gateway software running unit 51, a software managing unit 52, and service software 53, where the first registering unit 54 is configured to receive registration information of the home gateway, where the registration information includes a user name, a password, a home gateway address, a listening port number, and a device type, feedback registration response information to the home gateway so that the home gateway performs authentication, and after the authentication succeeds, determine that the home gateway has completed registration.

The specific work process of the registering unit 54 is as follows:

First, receive registration information of the home gateway, where the registration information includes a user name, a password, a home gateway address, a listening port number, and a device type.

Then, feedback registration response information to the home gateway so that the home gateway performs authentication, that is, feedback response information to the home gateway so that the home gateway performs authentication, thus implementing a bi-directional authentication process.

Finally, determine, after the authentication succeeds, that the home gateway has completed registration.

If the authentication succeeds, the home gateway is determined as a legal gateway (that is, the user name is recorded on the list of legal user names), or otherwise, the home gateway is an illegal gateway and its subsequent operations are rejected.

It should be noted that the home gateway software running unit in the server may be divided into multiple subunits according to the number of home gateways, and that different subunits correspond to different home gateways. In this case, if a home gateway is not online, it means that the running of the subunit corresponding to the home gateway is unnecessary. Likewise, in the case that the home gateway software running unit is not divided into multiple subunits, if no home gateway is online, the running of the home gateway software running unit is also unnecessary.

Figure 6:
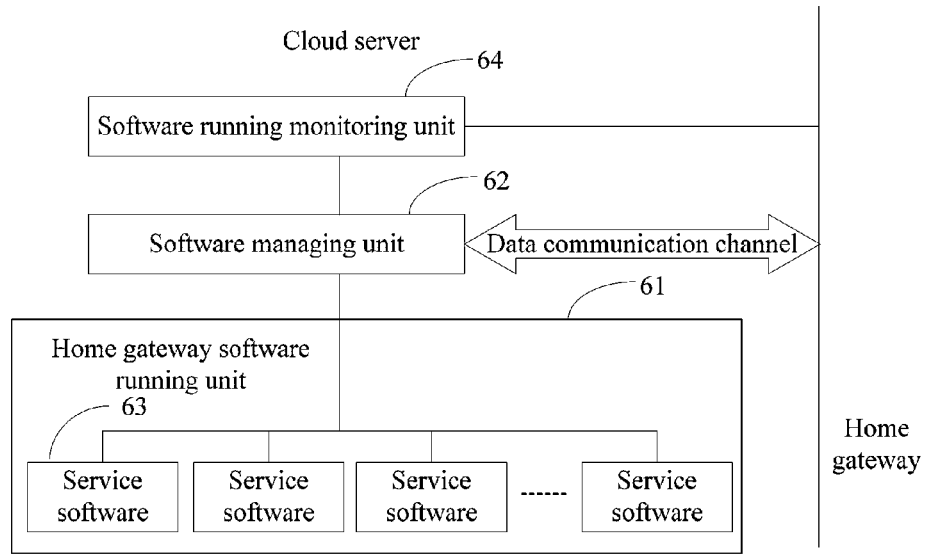
FIG. 6 is a schematic structural diagram of still another cloud server according to an embodiment of the present invention.
Figure 7:
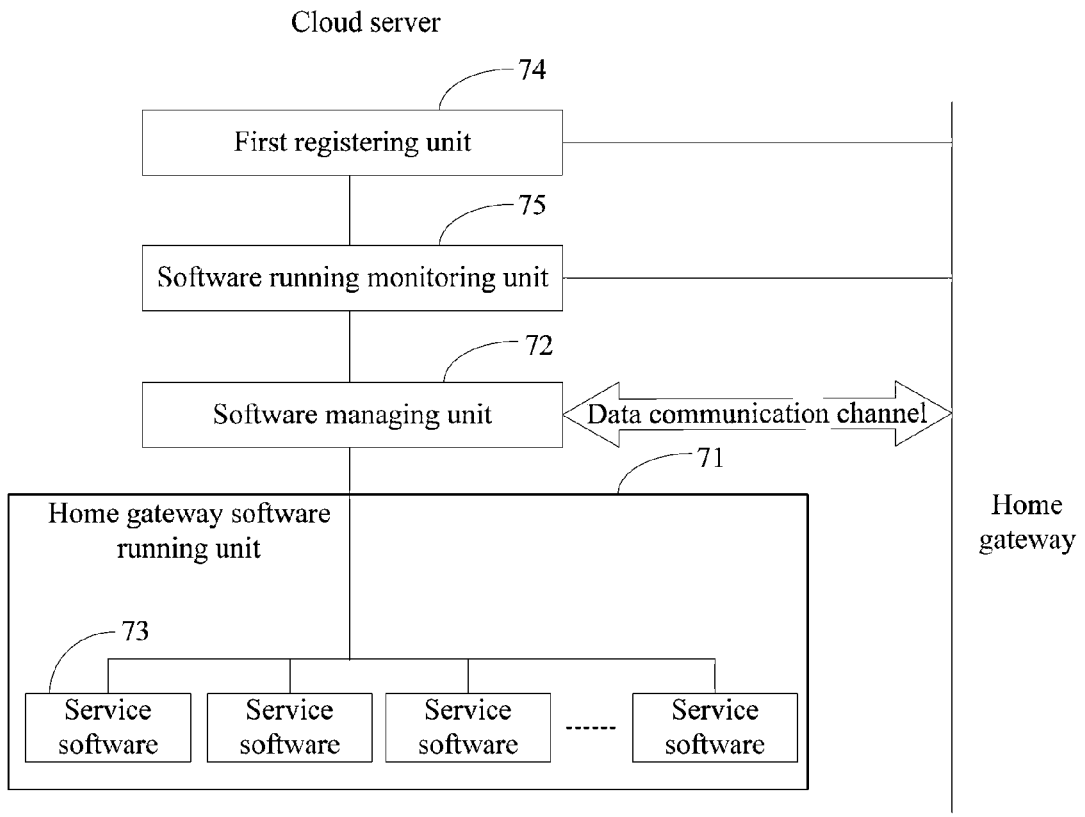
FIG. 7 is a schematic structural diagram of another cloud server according to an embodiment of the present invention.

Therefore, in some embodiments of the present invention, a unit for managing the home gateway software running unit is included. As shown in FIG. 6 and FIG. 7, a cloud server in FIG. 6 includes: a home gateway software running unit 61, a software managing unit 62, and service software 63, and further includes a software running monitoring unit, where functions of the home gateway software running unit 61, software managing unit 62, and service software 63 are basically the same as those of the foregoing units with the same names, and are not further described herein.

The software running monitoring unit 64 is configured to periodically monitor the working state of the home gateway. Before the software managing unit 62 establishes the data communication channel with the home gateway through the TCP/IP protocol, when the software running monitoring unit 64 determines that the home gateway is in the online state, the software managing unit 62 executes the step of establishing the data communication channel; and after the software managing unit 62 establishes the data communication channel with the home gateway through the TCP/IP protocol, when the software running monitoring unit 64 determines that the home gateway is not in the online state, the software managing unit 62 releases service software of the home gateway.

The cloud server shown in FIG. 7 includes: a home gateway software running unit 71, a software managing unit 72, a software module 73, a registering unit 74, and a software running monitoring unit 75, where functions of the units are basically the same as those of the foregoing units with same names in FIG. 6, and are not further described herein.

An embodiment of the present invention further provides a home gateway agent apparatus arranged in a home gateway and configured to communicate with a cloud server. A structure of the home gateway agent apparatus is shown in FIG. 8, and includes a data channel establishing unit 82 and a transparently transmitting unit 83.

The data channel establishing unit 82 is configured to establish a data communication channel with the cloud server.

The transparently transmitting unit 83 is configured to: receive a first software message from the cloud server through the data communication channel and forward the first software message to a first terminal to which the first software message is directed; or receive a second software message from a second terminal and send the second software message to the cloud server.

Figure 8:
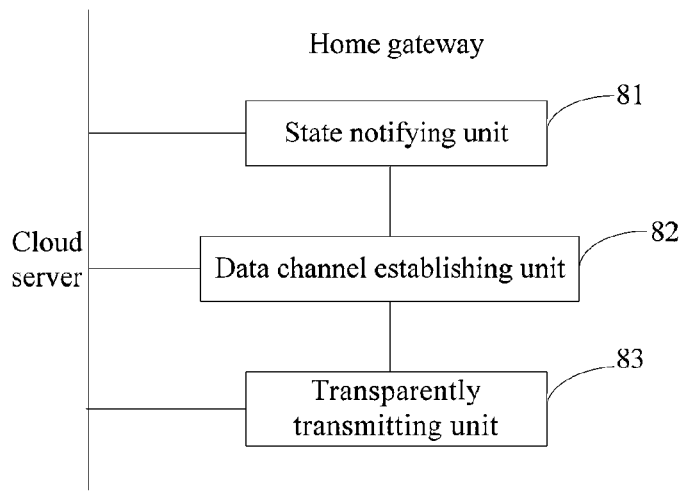
FIG. 8 is a schematic structural diagram of a home gateway agent apparatus according to an embodiment of the present invention.

As shown in FIG. 8, preferably, the home gateway agent apparatus further includes a state notifying unit 81, configured to notify the cloud server of the working state when the home gateway is powered on.

Figure 9:
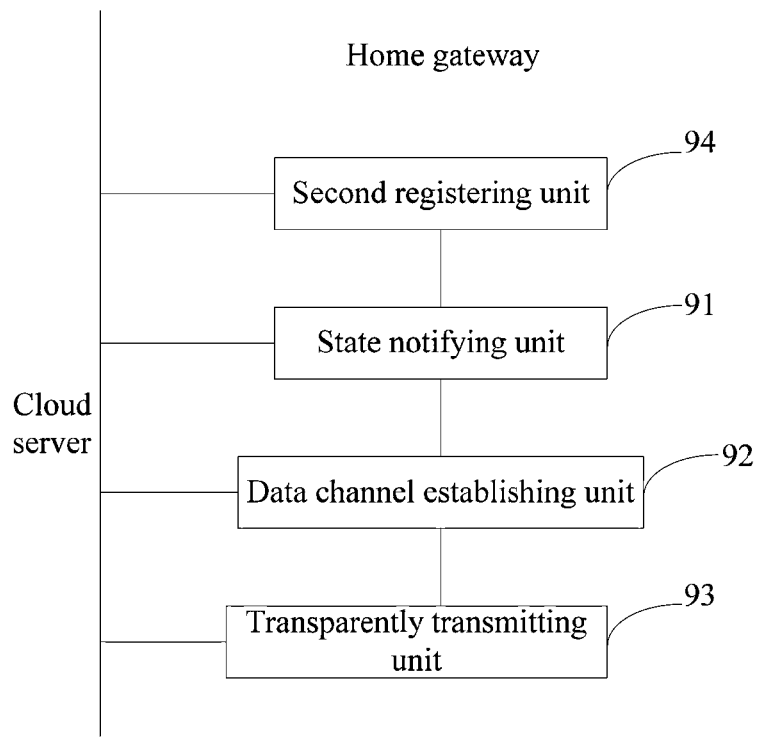
FIG. 9 is a schematic structural diagram of another home gateway agent apparatus according to an embodiment of the present invention.

The home gateway may become a legal home gateway through registration. FIG. 9 shows another structure of the home gateway, including: a state notifying unit 91, a data channel establishing unit 92, a transparently transmitting unit 93, and a second registering unit 94, where functions of the state notifying unit 91, data channel establishing unit 92, and transparently transmitting unit 93 are basically the same as those of the foregoing state notifying unit 81, data channel establishing unit 82, and transparently transmitting unit 83, and are not further described herein.

The second registering unit is configured to send registration information to the cloud server, receive response information fed back by the cloud server with respect to the registration information to perform authentication, and after the authentication succeeds, determine that the home gateway becomes a legal home gateway, where the registration information includes a user name, a password, a home gateway address, a listening port number, and a device type.

The home gateway address and listening port number are used by the server for initiating a connection instruction subsequently, while the device type may be used to specify the corresponding service.

The home gateway agent apparatus may be specifically a USB device agent apparatus (USB Device Agency) or a security device agent apparatus (Security Device Agency), or may be other agent apparatuses that those skilled in the art can think of.

It should be noted that the home gateway having the foregoing home gateway agent apparatus and the network system composed of the foregoing home gateway and server are all covered in the protection scope of the present invention.

Figure 10:
FIG. 10 is a schematic structural diagram of a communication system.

FIG. 10 shows a schematic diagram of a communication system. As shown in FIG. 10, the system includes a cloud server 101 and a home gateway 102.

The cloud server 101 is the foregoing cloud server, and the home gateway 102 is a home gateway having the foregoing home gateway agent apparatus.

The following further explains or describes the solution provided by this embodiment by using two specific application instances. In the application instances, the cloud server is specifically a java server, and determines the home gateway software running unit corresponding to each home gateway beforehand.

Application Instance 1

Figure 11:
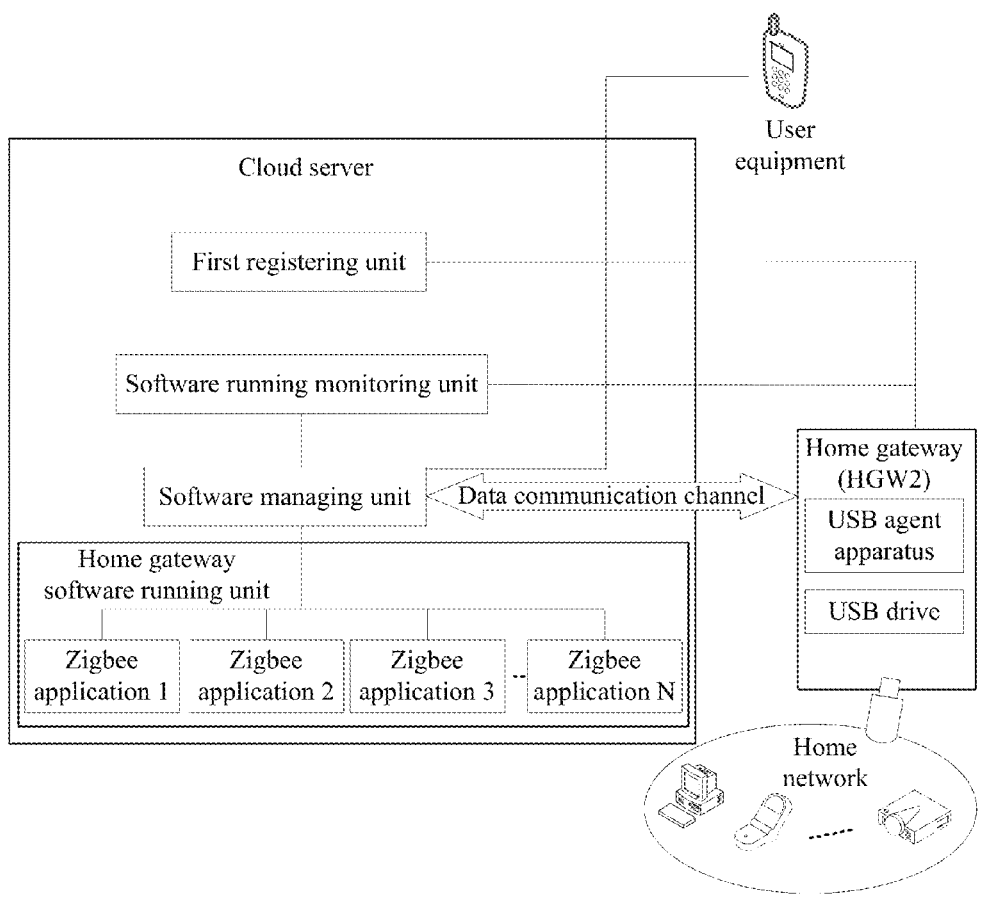
FIG. 11 is a schematic diagram of a system for communication between a cloud server and a home gateway according to an embodiment of the present invention.

The system shown in FIG. 11 includes a cloud server and a home gateway HGW2.

When working, the cloud server accepts registration of the HGW2, and determines the home gateway software running unit for the HGW2, where the home gateway software running unit has multiple pieces of service software such as the Zigbee application 1, Zigbee application 2, Zigbee application 3, . . . , and Zigbee application N, and a software managing unit for managing the software modules. In addition, the cloud server further includes a software running monitoring unit (HGW Running space management module), configured to manage the home gateway software running unit, including starting or shutting down the home gateway software running unit.

The registration information sent by the HGW2 in the registration process includes the following parameters: a user name, a password, a WAN interface IP address of the HGW2, a listening port number, and a model of the USB Zigbee module.

After the HGW2 has completed registration, the HGW2 notifies the software running monitoring unit when the HGW2 is powered on, and the software running monitoring unit uses the model of the USB Zigbee module, the WAN interface IP address of the HGW2, and the listening port number sent by the HGW2 in the registration process as startup parameters, and sends the parameters to the software managing unit of the home gateway software running unit to start the software managing unit. After the HGW2 has completed registration, the HGW2 starts to run its home gateway agent apparatus (USB Device Agency, namely, a USB agent apparatus), activates the USB module (namely, a USB Zigbee module) with the Zigbee function, and listens to the TCP/IP connection from the server.

The software managing unit starts the corresponding service software (assuming the Zigbee application 1) according to the obtained model of the USB Zigbee module, and initiates a TCP/IP connection to the USB Device Agency according to the WAN interface IP address of HGW2 and listening port number, and determines, after receiving the response information from the USB Device Agency, that the data communication channel is established. Meanwhile, the software managing unit establishes an associated channel with the started Zigbee application 1, and transparently transmits the input and output data of the USB Zigbee application over the TCP/IP connection.

After the foregoing data communication channel is established, the Zigbee application 1 can control the USB Zigbee module through the home gateway HGW2, including: sending a Zigbee module reset command to reset the USB Zigbee module, collecting home device (Zigbee terminal) information in the home network, and executing various Zigbee-based home services, for example, Push (push) the collected information to the remote user equipment through the home gateway HGW2, or receive a control instruction of the user equipment and control work of the corresponding Zigbee terminal.

Application Instance 2

Figure 12:
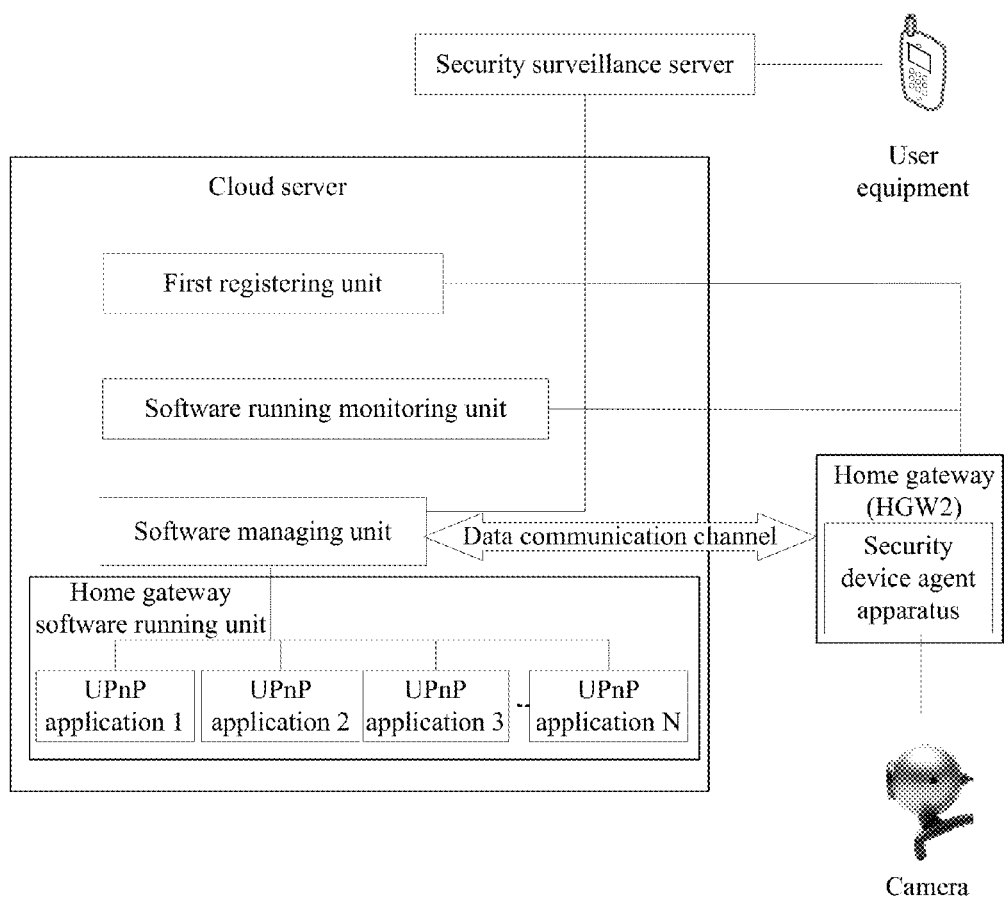
FIG. 12 is a schematic diagram of another system for communication between a cloud server and a home gateway according to an embodiment of the present invention.

The system shown in FIG. 12 includes a cloud server and an HGW1. The HGW1 needs to implement a UPnP control point in the home network through a home gateway agent apparatus (Security Device Agency, namely, a security device agent), in order to encapsulate and transparently transmit the UPnP protocol communicated by a security camera in the home network to a cloud-end third-party application, so that the cloud-end third-party application implements management and control functions such as automatically discovering, configuring, diagnosing, and resetting the security device in the home network. The security surveillance data, under the control of the third-party application, is transparently transmitted to the cloud-end security surveillance server, and is pushed by the security surveillance server to the user equipment for implementing remote surveillance.

When working, the cloud server accepts registration of the HGW1, and determines the home gateway software running unit for the HGW1, where the home gateway software running unit has multiple pieces of service software such as the UPnP application 1, UPnP application 2, UPnP application 3, . . . , and UPnP application N, and a software managing unit for managing the software modules. In addition, the cloud server further includes a software running monitoring unit (HGW Running space management module), configured to manage the home gateway software running unit, including starting or shutting down the home gateway software running unit.

The registration information sent by the HGW1 in the registration process includes the following parameters: a user name, a password, a WAN interface IP address of the HGW1, a listening port number, and a type of the UPnP device.

After the HGW1 has completed registration, the HGW1 notifies the software running monitoring unit when the HGW1 is powered on, and the software running monitoring unit uses the type of the UPnP device, WAN interface IP address of the HGW1, and listening port number sent by the HGW1 in the registration process as startup parameters, and sends the parameters to the software managing unit of the home gateway software running unit to start the software managing unit. After the HGW1 completes registration, the HGW1 starts to run its home gateway agent apparatus (Security Device Agency, namely, a security device agent apparatus), and the home gateway agent apparatus discovers, records, and reports various UPnP devices with the surveillance function in the home network, and starts to listen to the TCP/IP connection from the server.

The software managing unit starts the corresponding service software (assuming the UPnP application 2) according to the obtained type of the UPnP device, and initiates a TCP/IP connection to the Security Device Agency according to the WAN interface IP address of the HGW1 and listening port number, and determines, after receiving the response information from the Security Device Agency, that the data communication channel is established. Meanwhile, the software managing unit establishes an associated channel with the started UPnP application 2 to transparently transmit the UPnP packets on the data communication channel.

After the foregoing data communication channel is established, the UPnP application 2 can send UPnP commands through the home gateway HGW2 to execute various UPnP-based home surveillance services, for example, collect home device information in the home network, upload the information to the cloud-end security surveillance server through the home gateway HGW2, and Push (push) the information to the remote user equipment through the security surveillance server, or receive the control instruction of the user equipment and control work of the corresponding home device.

In the technical solution provided by the present invention, a home gateway software running unit is arranged on the server and configured to store and run various software modules. In one aspect, this mode breaks the proportional relationship between the storage resources of the home gateway and the implementation of new services in the prior art, so that the home gateway having limited storage resources can implement a large number of new services, thus reducing the costs of the home gateway device. In another aspect, when a new service needs to be implemented, only corresponding software module needs to be loaded to the server, so that good extensibility is achieved. For example, when a DLNA service needs to be implemented, a software module related to the DLNA service is arranged in the home gateway software running unit of the server; thereby, by executing the software module, the DLNA service can be implemented, that is, the home gateway agent apparatus transparently transmits the DLNA control protocol to extend the DLNA application to the cloud end for running.

Furthermore, some embodiments provided by the present invention are capable of detaching the software modules from the home gateway to communicate with different home gateways, thus improving utilization of the software resources, and avoiding the problem of resource waste caused by arranging the same software modules repetitively for multiple home gateways; and the cloud server can exchange information with a terminal by sending software messages and receiving software messages through the home gateway.

All embodiments describe the present invention by using the progressive method. Each embodiment describes only the difference from other embodiments. For the similar parts among all embodiments, reference may be made to the relevant parts. The apparatus disclosed in the embodiment is related to the method disclosed in the embodiments, and is therefore outlined. For the associated part, reference may be made to the description in the method embodiments.

In should be understood by persons skilled in the art that information, signals and messages may be expressed by any one of the various techniques and technologies. For example, the message and the information which are mentioned in the foregoing illustration can be denoted by voltages, currents, electromagnetic waves, magnetic fields or particles, optical fields, or any combination thereof.

Persons skilled in the art may further notice that the units, algorithms, and steps in each example described in the public embodiments of the present invention may be implemented by electronic hardware, computer software, or combination of both. To clearly describe the changeability of the hardware and software, the composition and steps of each example are generally described according to functions in the foregoing description. Whether the functions are executed by hardware or software depends on particular applications and design constraint conditions of the technical solutions. Persons skilled in the art may use different methods to implement the described functions for each particular application, but it should not be considered that the implementation goes beyond the scope of the present invention.

Persons of ordinary skill in the art may understand that all or a part of the processes of the method in the embodiments of the present invention may be implemented by a program instructing relevant hardware. The program may be stored in a computer readable storage medium. When the program is run, the processes of the method in the embodiments of the present invention are performed. The storage medium may be a magnetic disk, an optical disk, a read-only memory (Read-Only Memory, ROM), or a random access memory (Random Access Memory, RAM).

The foregoing description disclosed in the embodiments allows persons skilled in the art to implement or use the present invention. Multiple modifications to these embodiments are apparent for persons skilled in the art. The general principle defined in the present invention may be implemented in other embodiments without departing from the scope of the present invention. Therefore, the present invention will not be limited to the embodiments described in the document but extends to the widest scope that complies with the principle and novelty disclosed in the document.

What is claimed is:

1. A method for communication between a cloud server and a home gateway connected to at least one terminal by way of a local discovery communication protocol, wherein the cloud server has a home gateway software running unit configured to run service software as a proxy for services requested from the home gateway by the at least one terminal, the method comprising:

establishing, by the cloud server, a data communication channel with the home gateway through a Transmission Control Protocol/Internet Protocol TCP/IP and the local discovery communication protocol such that the at least one terminal is able to send messages to the cloud server by passing the messages through the home gateway and to the cloud server;

running, by the home gateway software running unit, service software of the home gateway to generate a first message required for the at least one terminal to provide services to a user, while the home gateway executes other service software of the home gateway to serve the at least one terminal or another terminal connected to the home gateway;

sending, by the home gateway software running unit, a first message to the home gateway through the data communication channel, so that the home gateway forwards the first message to the at least one terminal identified by the first message;

receiving, by the home gateway software running unit, a second message from the home gateway through the data communication channel, wherein the second message is based on the local discovery communication protocol and sent by the at least one terminal to the home gateway; and sending, by the home gateway software running unit, to the at least one terminal by way of the home gateway a service requested by the second message from the terminal.

2. The method according to claim 1, further comprising:
after the cloud server establishes the data communication channel with the home gateway, the cloud server terminates running the service software of the home gateway when the home gateway in not in an online state.

3. The method according to claim 2, further comprising determining whether the home gateway is in the online state by periodically monitoring a working state of the home gateway.

4. The method according to claim 1, wherein, before the establishing, by the cloud server, the data communication channel with the home gateway, the method further comprises:
receiving, by the cloud server, registration information of the home gateway, wherein the registration information comprises a user name, a password, a home gateway address, a listening port number, and a device type;
feeding back, by the cloud server, registration response information to the home gateway so that the home gateway performs authentication; and
after the authentication succeeds, determining, by the cloud server, that the home gateway has completed registration,
wherein the establishing, by the cloud server, the data communication channel with the home gateway comprises initiating, by the cloud server, a TCP/IP connection to the home gateway according to the home gateway address and the listening port number, and when receiving connection establishment response information, determining that the data communication channel is established.

5. A cloud server in communication with a home gateway connected to at least one terminal by way of a local discovery communication protocol, wherein the cloud server includes a processor and a memory storing instructions for execution by the processor so as to configure the cloud server to:
establish a data communication channel with the home gateway through a Transmission Control Protocol/Internet Protocol TCP/IP and the local discovery communication protocol such that the at least one terminal is able to send messages to the cloud server by passing the messages through the home gateway and to the cloud server;
run service software of the home gateway to generate a first message required for the at least one terminal to provide services to a user, while the home gateway executes other service software of the home gateway to serve the at least one terminal;
send the first message, through the data communication channel, to the home gateway which forwards the first message to the at least one terminal identified by the first message;
receive a second message from the home gateway through the data communication channel, wherein the second message is based on the local discovery communication protocol and sent by the at least one terminal to the home gateway; and
send to the at least one terminal by way of the home gateway a service requested by the second message from the terminal.

6. The cloud server according to claim 5, wherein after establishing the data communication channel with the home gateway, the processor is further configured to terminate running the service software when the home gateway is not in the online state.

7. The cloud server according to claim 5, wherein the processor is further configured to:
receive registration information of the home gateway, wherein the registration information comprises a user name, a password, a home gateway address, a listening port number, and a device type, feedback registration response information to the home gateway so that the home gateway performs authentication, and after the authentication succeeds, determine that the home gateway has completed registration;
initiate a TCP/IP connection to the home gateway according to the home gateway address and the listening port number; and
when receiving connection establishment response information, determine that the data communication channel is established.

8. A method for communication between a home gateway and a cloud server, wherein at least one terminal is connected to the home gateway by way of a local discovery communication protocol, wherein the cloud server is configured to run service software as a proxy for services requested from the home gateway by the at least one terminal, and the method comprising:
establishing, by the home gateway, a data communication channel with the cloud server through a Transmission Control Protocol/Internet Protocol TCP/IP and the local discovery communication protocol such that the at least one terminal is able to send messages to the cloud server by passing the messages through the home gateway and to the cloud server by way of the communication channel;
receiving, by the home gateway, a first message from the cloud server running the service software of the home gateway through the data communication channel, while executing by the home gateway other service software to serve the at least one terminal;
transmitting, by the home gateway, the first message from the cloud server, to the at least one terminal to provide services to users;

sending, by the home gateway, a second message to the cloud server through the data communication channel, wherein the second message is based on the local discovery communication protocol and sent by the at least one terminal to the home gateway; and receiving from the cloud server, by the home gateway, a service requested by the second message from the at least one terminal and transmitting the service to the terminal.

9. The method according to claim 8, further comprising:

sending registration information to the cloud server, wherein the registration information comprises a user name, a password, a home gateway address, a listening port number, and a device type;

receiving response information of the cloud server and performing authentication;

performing authentication to the home gateway; and after the authentication succeeds, determining that the home gateway becomes a legal home gateway.

10. The method according to claim 8, wherein the data communication channel is established with the cloud server comprises:

listening to a TCP/IP connection instruction from the cloud server, and after receiving the TCP/IP connection instruction initiated by the cloud server according to a home gateway address and a listening port number, feeding back response information to the cloud server to determine that the data communication channel is established.

11. The method according to claim 8, wherein the local discovery communication protocol is one of a Zigbee protocol, a Universal Plug and Play UPnP protocol, a Bluetooth protocol, a Wireless Fidelity Wi-Fi protocol, and an infrared protocol.

12. A home gateway agent apparatus arranged in a home gateway, comprising a processor and a memory storing executable instructions for execution by the processor so as to configure the processor to:

notify a cloud server of a working state when the home gateway is powered on;

establish a data communication channel with the cloud server when the cloud server determines that the home gateway is in the online state;

receive through the data communication channel a first message generated by the cloud server which runs service software of the home gateway;

transmit the first message to at least one terminal to provide services to users;

execute other service software to serve the at least one terminal while the cloud server runs the service software of the home gateway;

send a second message to the cloud server through the data communication channel, wherein the second message is based on the local discovery communication protocol and originating from the at least one terminal; and receiving a service requested by the second message from the cloud server and passing the second message to the at least one terminal.

13. The home gateway agent apparatus according to claim 12, wherein the processor is further configured to:

send registration information to the cloud server, receive response information fed back by the cloud server with respect to the registration information to perform authentication, and after the authentication succeeds, determine that the home gateway becomes a legal home gateway, wherein the registration information comprises a user name, a password, a home gateway address, a listening port number, and a device type.

14. The home gateway agent apparatus according to claim 12, wherein the home gateway agent apparatus is a universal serial bus (USB) device agent apparatus or a security device agent apparatus.

15. A home gateway comprising a home gateway agent apparatus, wherein the gateway agent apparatus comprises a processor and a memory storing executable instructions for execution by the processor so as to configure the processor to:

notify a cloud server of a working state when the home gateway is powered on;

establish a data communication channel with the cloud server when the cloud server determines that the home gateway is in the online state;

receive through the data communication channel a first message generated by the cloud server which runs service software of the home gateway;

transmit the first message to at least one terminal to provide services to users;

execute other service software to serve the at least one terminal while the cloud server runs the service software of the home gateway;

send a second message to the cloud server through the data communication channel, wherein the second message is based on the local discovery communication protocol and originating from the at least one terminal; and receiving a service requested by the second message from the cloud server and passing the second message to the at least one terminal.

16. The home gateway agent apparatus according to claim 15, wherein the processor is further configured to:

send registration information to the cloud server, receive response information fed back by the cloud server with respect to the registration information to perform authentication, and after the authentication succeeds, determine that the home gateway becomes a legal home gateway, wherein the registration information comprises a user name, a password, a home gateway address, a listening port number, and a device type.

17. The home gateway agent apparatus according to claim 15, wherein the home gateway agent apparatus is a universal serial bus (USB) device agent apparatus or a security device agent apparatus.

* * * * *